United States Patent [19]

Derakhshani et al.

[11] Patent Number: 4,900,486
[45] Date of Patent: Feb. 13, 1990

[54] MULTI-LEVEL SEALING METHOD

[75] Inventors: Felora Derakhshani; Ricky Gotcher, both of Round Rock,, Tex.

[73] Assignee: Weed Instrument Company, Inc., Round Rock, Tex.

[21] Appl. No.: 252,544

[22] Filed: Oct. 3, 1988

[51] Int. Cl.$^4$ .............................................. B29C 39/10
[52] U.S. Cl. .................................. 264/40.1; 264/254; 264/255; 264/272.13; 264/272.18
[58] Field of Search ...................... 264/272.13, 272.18, 264/40.1, 279, 250, 254, 255

[56] References Cited

U.S. PATENT DOCUMENTS

| | | | |
|---|---|---|---|
| 2,194,703 | 3/1940 | Kater | 264/272.18 |
| 3,517,111 | 6/1970 | Johnson | 264/272.18 |
| 3,670,091 | 6/1972 | Frantz | 264/272.18 |
| 4,576,768 | 3/1986 | Markert et al. | 264/272.13 |

FOREIGN PATENT DOCUMENTS 843334  6/1981  U.S.S.R. .......................... 264/272.13

OTHER PUBLICATIONS

WO88/00135, Potted Electrical/Mechanical Devices, and Dual Cure Potting Method, Drain et al. 1-14-88 (264/272.18).

*Primary Examiner*—James Lowe
*Attorney, Agent, or Firm*—J. Nevin Shaffer, Jr.

[57] ABSTRACT

A multi-level sealing method wherein an electrical element to be sealed is heated. Once heated, a quick curing first seal is applied to the electrical element thereby preventing the introduction of moisture, and other elements, into an electrical element as the seal cures. A second seal is applied, over the first seal and the element, that is high temperature and slow curing. As a result, the second seal has a different grain structure and the likelihood of a common moisture path into the electrical element is substantially eliminated. Therefore, once the high temperature, slow curing, second seal has cured, the reintroduction of moisture into the electrical element is prohibited. Additional layers of sealant may be added, if desired.

12 Claims, 2 Drawing Sheets

MULTI-LEVEL SEALING METHOD

BACKGROUND OF THE INVENTION

This invention relates to an improved multi-level sealing method for effectively sealing electronic elements from moisture.

A variety of means and methods have been known in the art for preventing moisture from entering electrical elements. For example, preformed solid sealants have been designed, which melt, or are liquefiable upon the application of heat, and are hardenable again to a solid state. Such a sealant is disclosed in Siner, U.S. Pat. No. 3,077,639, which is shaped so as to allow air, caused to expand in the casing or electrical element being sealed upon the application of heat, to escape through the area being sealed prior to the sealing thereof. The air, therefore, escapes before the sealant covers the opening and formation of bubbles in the sealant is presumably prevented.

Other inventions have been patented which are designed to protect the electrical element from direct contact from a mold while sealant is being applied to the electrical element. Such patents are exemplified by Sternbeck, U.S. Pat. No. 3,165,568, which uses a "free form foil" and Schroeder, U.S. Pat. No. 4,374,080, which utilizes a "silicon mold", which, because of the design of the mold, allows the molds to be stacked. Because the mold is made of silicon rubber, no mold release agents are needed and, therefore, the metal electrical leads of the electrical device to be sealed are free to bond with the encapsulation or sealant material. Other inventions utilize a combination of pressure and vacuum to ensure a proper seal, free of bubbles. Such an invention is disclosed in Oldham, U.S. Pat. No. 4,681,718.

A drawback to the methods of sealing electrical elements, known in the art, is that water is drawn into the electrical element, through the seal, as the sealant cools. Additionally, with only one layer of sealant applied in a single application, water typically can seep through minute pathways in the sealant into the electrical element. Thus, there is a need in the art for providing a method of sealing electrical elements and the like, so that moisture is prevented from being drawn into the electrical element as the seal cools and that, once the seal is cooled, that moisture is prevented from seeping through the seal into the element. It, therefore, is an object of this invention to provide an improved multi-level sealing method for preventing moisture from being drawn into the element as the seal cools and for preventing seepage of moisture into the element after the seal has cooled.

SHORT STATEMENT OF THE INVENTION

Accordingly, the multi-level sealing method of the present invention includes heating the element to be sealed and applying a quick curing first sealant to the element. The quick curing first sealant is then allowed to cure and, once cured, an application of a high temperature, slow curing, second sealant is applied over the first sealant. The element with the first seal and the second sealant in place, is then reheated and the second sealant is then allowed to slowly cure so that a multi-level seal is provided.

The first sealant is comprised of an epoxy selected for its ability to adhere to metals, plastics, and ceramics. This first epoxy is mixed with a curing catalyst so that the resultant first sealant cures quickly at room temperature and even more quickly if heated. Once the first sealant is prepared, it is applied to the heated element so that the element is sealed quickly before moisture is drawn past the first sealant into the element. This first sealant can be allowed to cure at room temperature or, once again, the first sealant may be cured more quickly if heated, preferably to temperature above 200° F.

Once the first sealant is cured and in place, a second, high temperature sealant is prepared that is comprised of a high temperature epoxy that adheres to metals, plastics, and ceramics. The high temperature epoxy is mixed with a curing catalyst so that the resultant second sealant cures slowly at high temperatures. Once the second sealant is prepared, it is applied over the first sealant so that two sealant boundaries are formed and any moisture that happens to pass the second sealant is prevented from entering the element by the first sealant. Because the grains of the two epoxys are substantially different, no common path into the element is likely to exist when utilizing this procedure.

The reheating of the element is preferably done in two stages so that the second sealant is heated to temperature above 200° F. for curing for a first period of time, followed by heating to temperatures above 300° F. for curing for an additional, second, period of time. In the preferred embodiment, utilizing the preferred epoxy and catalyst, the first period of time is at least 3 hours and curing for the second period of time is also at least 3 hours.

As a result, a multi-level sealing method is provided that initially prevents the introduction of moisture into the electronic element by means of the application of a first quick curing sealant while the element is hot. Further, the application of a second, slow curing high temperature sealant creates a multi-level boundary that effectively prevents the introduction of moisture into the electronic element once the second seal has cured.

BRIEF DESCRIPTION OF THE DRAWINGS

Other objects, features, and advantages of the present invention will become more fully apparent from the following detailed description of the preferred embodiment, the appended claims, and the accompanying drawings in which:

DETAILED DESCRIPTION OF THE PREFERRED EMBODIMENT

Figure 1:
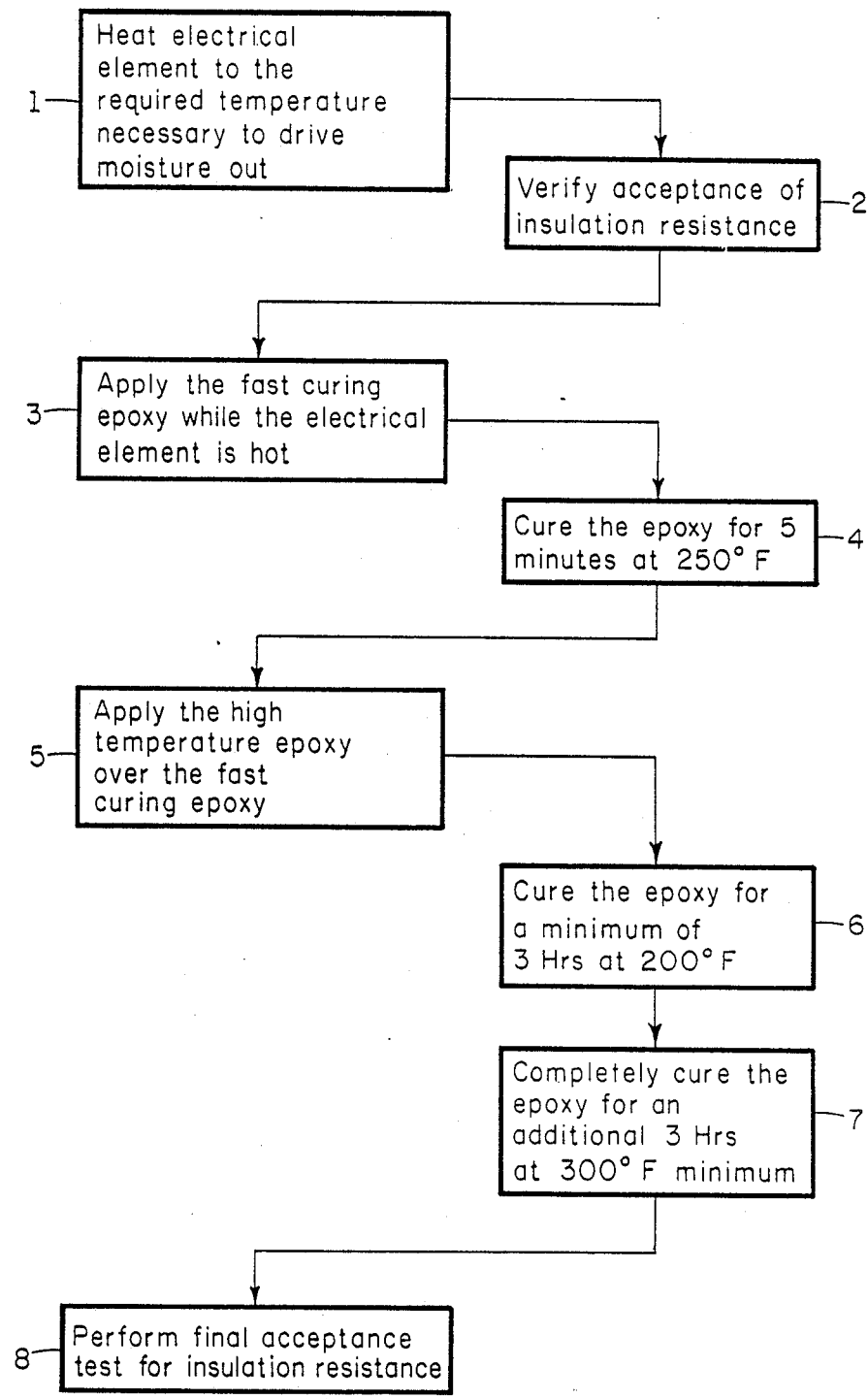
FIG. 1 presents a flow chart representation of the process steps for the preferred embodiment of the present invention.
Figure 2:
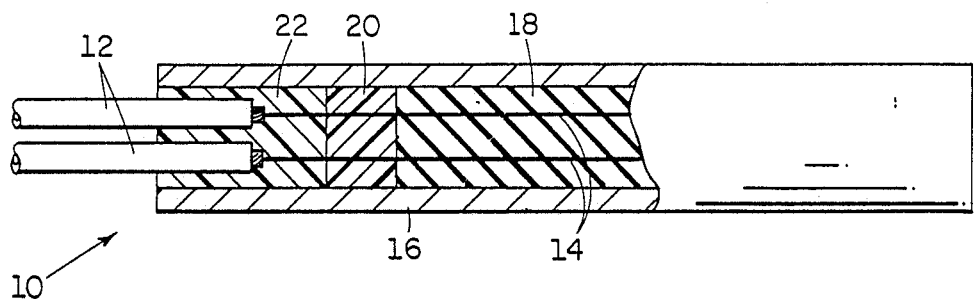
FIG. 2 is a cross-sectional view of the multi-level sealing method applied to an electrical element.

The preferred embodiment of the present invention is disclosed hereafter and illustrated by way of example in FIGS. 1 and 2. Referring to FIG. 1, the first step is to heat the element to be sealed to a temperature high enough to drive moisture out. The utilization of the method of this invention can be with any of a variety of electronic devices that require sealing against the introduction of foreign matter such as moisture. The use of this method has been specifically utilized to solve the problem of moisture being introduced to resistance temperature detectors (RTD's). Sealant methods known in the art, as previously disclosed, have the disadvantage that, as the seal is allowed to cure on the electrical element, moisture, in fact, is introduced and drawn back into the element itself. As a result, moisture is actually sealed within the element and the life expectancy of the element is greatly decreased. Further, the accuracy of readings obtained from these devices are decreased and waste and scrapage of prior art electrical devices is significant.

The second step is to verify that moisture has been driven out. This is accomplished by applying voltage to the electrical element and measuring resistance if the resistance is low, then moisture is present. If resistance is high, then the element is dry.

The third step of the method of this invention is to apply a quick curing first sealant to the heated element. The quick curing first sealant can be any sealant known in the art. A preferred sealant is created by use of the Emerson and Cuming STYCAST epoxy 2651-40. This epoxy is a casting resin with excellent adhesion to metals, plastics, and ceramics. It is a very versatile epoxy resin which will cure very easily in a variety of different ways, including a room temperature cure when mixed with a specific catalyst. This catalyst is known as "Catalyst 9". The proper mixture of the epoxy with the catalyst 9 is 8% by weight of catalyst 9 added to the 2651-40 epoxy. This mixture will have a "pot life" of about 30 minutes after it is mixed. This mixture will cure by itself at room temperature within eight hours. It can also be cured in 5 minutes at 250° F., which is the preferred fourth step.

The epoxy 2651-40, of the preferred embodiment, can also be mixed with catalyst 11. In this case, 10 to 11 parts of catalyst 11 by weight are added for each 100 parts of the 2651-40 epoxy. This mixture will have a pot life of at least four hours after it is mixed. The sealant produced will then cure at 210° F. to 220° F. for two hours, at a minimum. For the best high temperature properties, the post cure time should be four to eight hours at 250° F. The advantage of catalyst 11 are that it provides a long pot life, enhanced thermo shock and improved high temperature properties.

The fourth step allows the first sealant means to cure. Once the first sealant has cured, the fifth step is for a second, high temperature, slow curing sealant is applied over the first sealant. There are many such second sealants available that are known in the prior art. A preferred second sealant is Emerson and Cuming STYCAST 2762 epoxy. The 2762 epoxy is an excellent, very high temperature, epoxy casting resin and sealing compound. It exhibits an excellent adhesion to metals, plastics, and ceramics. Further it is a very versatile epoxy which can be cured easily and in a variety of ways with a variety of different kinds of catalysts. A preferred embodiment is to utilize catalyst 17. When epoxy 2762 is to be used with catalyst 17, 10% by weight of catalyst 17 is added to the STYCAST 2762 epoxy. Catalyst 17 may be solid at room temperature, and, therefore, it may require slight warming (66° C.) if it is desired to improve the flow. The 2762 epoxy resin itself may also be warmed slightly (66° C.) if it is desired to improve the flow of the epoxy as well. The resultant sealant mixture will have a pot life of 30 minutes. Once application of this sealant is accomplished, it should cure for a minimum of 3 hours at a minimum of 93° C. (200° F.) followed by a minimum of 3 hours at a minimum of 149° C. (300° F.), as the preferred sixth and seventh steps.

The heating of the element and the first and second sealants, and the step of allowing the second sealant to slowly cure at high temperatures ensures that a multi-level seal is provided. The multi-level seal is comprised of two seals with different grain structures. As a result, it is unlikely that a common moisture path into the electrical element will exist. The application of the second, multi-level, seal ensures that seepage into the electrical element is prevented once the second seal has cured. The eight and final step is to perform a final, acceptance test of resistance. If measured resistance is high, the element is dry and very likely to stay so.

Referring to FIG. 2, a cross-sectional view of an electrical element 10 is shown. Electrical element 10 in this preferred embodiment is a resistance temperature detector comprised of insulated stranded lead wires 12 and solid lead wires 14. Solid lead wires 14 are encapsulated in an encapsulation case 16 of some impervious material known in the art and not discussed further hereafter. Additionally, the interior of encapsulation case 16 is filled with hygroscopic insulation material 18 also known in the art. First sealant 20 comprised of fast curing epoxy, as discussed above, forms the first seal of electrical element 10 after the moisture has been driven out and cures quickly enough so that moisture is prevented from being drawn back in as the first sealant 20 cures. Second sealant 22 is applied on top of first sealant 20 after first sealant 20 has cured. Second sealant 22, as discussed above, is comprised of a high temperature epoxy that is cured in two stages in the preferred embodiment. Once second sealant 22 is in place, the electrical element is once again tested for resistance to determine if the interior of the element is, in fact, dry.

In summary, by means of the method of the present invention, a method of sealing is provided that accomplishes two vital functions. First, the application of a quick curing, first sealant, while the electrical element is hot, ensures that the moisture content is driven out completely prior to application of the sealant and that the moisture is not drawn back into the electrical element as the seal is applied and cured. Secondly, the application of a second, slow curing sealant, ensures that first, two different grain structures exist so that a similar leakage path is precluded and second, a higher temperature application is achieved. As a result, once the second sealant is in place and cured, the reintroduction of moisture to the device is prevented. Therefore, the accuracy of RTD's, in particular, and electrical elements, in general, is significantly improved and the scrapage rate for electrical elements, due to moisture damage, is sigificantly decreased.

It is important to know that by use of the method of this invention, not only is moisture dealt with, but the introduction of gases, and other elements into sensitive electrical elements is likewise prohibited.

Applicants have not found it necessary to add a third level, although one or more could be added. It is entirely possible that some electrical elements will require more than the single multi-level application disclosed herein.

Therefore, while the present invention has been disclosed in connection with the preferred embodiment thereof, it should be understood that there may be other embodiments which fall within the spirit and scope of the invention as defined by the following claims.

What is claimed is:

1. A multi-level sealing method comprising the steps of:
   A. heating an element to be sealed until moisture is absent;
   B. applying a quick curing first sealant means to said element;

C. allowing said first sealant means to cure;
D. applying a high temperature, slow curing second sealant means over said first sealant means;
E. reheating said element and said second sealant means; and
F. allowing said second sealant means to slowly cure so that a multi-level seal is provided.

2. The method of claim 1 wherein applying a quick curing first sealant means comprises the steps of:
A. selecting an epoxy means that adheres to metals, plastics, and ceramics;
B. mixing said epoxy means with a curing catalyst so that said resultant first sealant means cures quickly at room temperature and more quickly when heated; and
C. applying said first sealant means to said heated element so that said element is sealed before moisture is drawn past said first sealant means into said element.

3. The method of claim 2 wherein allowing said first sealant means to cure comprises the step of curing said first sealant means at room temperature.

4. The method of claim 2 wherein allowing said first sealant means to cure comprises the step of curing said first sealant means at temperature above 200° F.

5. The method of claim 3 wherein applying a high temperature slow curing second sealant means over said first sealant means comprises the steps of:
A. selecting a high temperature epoxy means that adheres to metals, plastics, and ceramics;
B. mixing said high temperature epoxy means with a curing catalyst so that said resultant second sealant means cures slowly at high temperature; and
C. applying said second sealant means over said first sealant means so that two sealant boundaries are formed and any moisture that passes said second sealant means is prevented from entering said element by said first sealant means.

6. The method of claim 5 wherein reheating said element and said second sealant means comprises the step of heating said element and said second sealant means to temperatures above 200° F. for curing for a first period of time followed by heating to temperatures above 300° F. for curing for an additional, second period of time.

7. The method of claim 6 wherein curing for said first period of time is at least 3 hours and curing for said second period of time is at least 3 hours.

8. A multi-level sealing method comprising the steps of:
A. heating an element to be sealed;
B. testing said element to ensure moisture is absent;
C. selecting an epoxy means that adheres to metal, plastics, and ceramics;
D. mixing said epoxy means with a curing catalyst so that a resultant first sealant means cures quickly at room temperature and more quickly when heated;
E. applying said first sealant means to said heated elements so that said element is sealed before moisture is drawn past said first sealant means into said element;
F. selecting a high temperature epoxy means that adheres to metals, plastics, and ceramics;
G. mixing said high temperature epoxy means with a curing catalyst so that a resultant second sealant means cures slowly at high temperature;
H. applying said second sealant means over said first sealant means so that two sealant boundaries are formed and any moisture that passes said second sealant means is prevented from entering said element by said first sealant means;
I. retesting said element to ensure moisture is still absent.

9. The method of claim 8 further comprising the step of allowing said first sealant means to cure at room temperature.

10. The method of claim 8 wherein allowing said first sealant means to cure comprises the step of curing said first sealant means at temperatures above 200° F.

11. The method of claim 9 further comprising the step of heating said element and said second sealing means to temperatures above 200° F. for curing for a first period of time followed by heating to temperatures above 300° F. for curing for an additional, second period of time.

12. The method of claim 10 wherein curing for said first period of time is at least 3 hours and curing for said second period of time is at least 3 hours.

* * * * *